(No Model.)
R. E. BOSCHERT.
STRAIN INDICATOR FOR SCREW PRESSES.
No. 312,800. Patented Feb. 24, 1885.
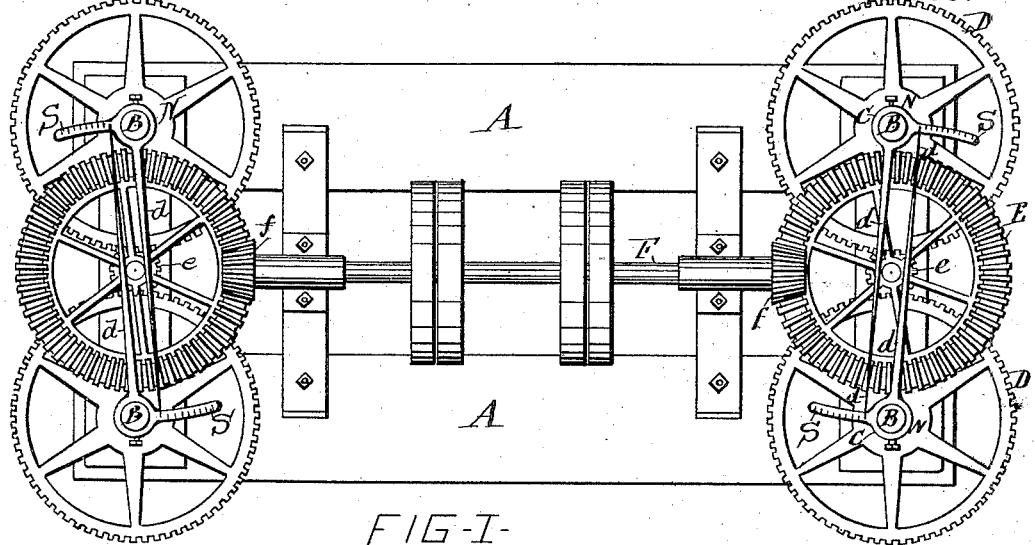
FIG-I-
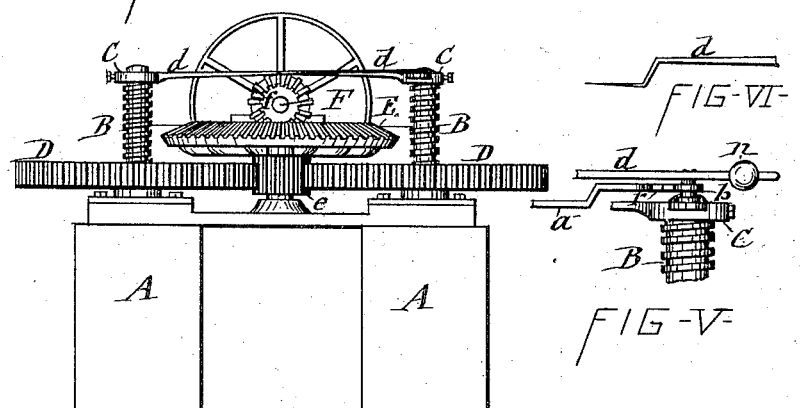
FIG-II-
FIG-VI-
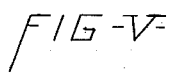
FIG-V-
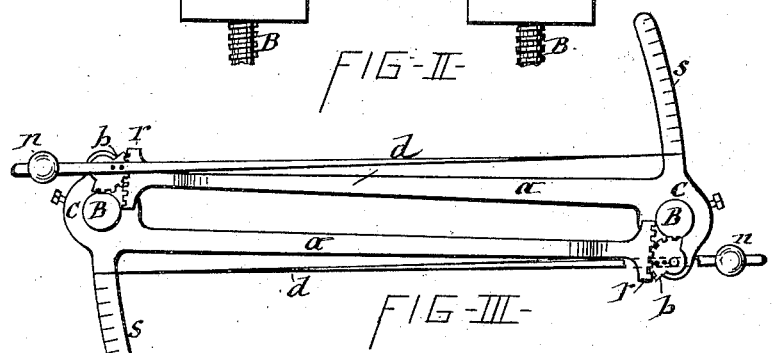
FIG-III-
FIG-IV-
WITNESSES:
C. Bendixon
Wm. C. Raymond
INVENTOR:
Rufus E. Boschert
per Duell, Lacrost Hey
his attys

UNITED STATES PATENT OFFICE.

RUFUS E. BOSCHERT, OF SYRACUSE, NEW YORK.

STRAIN-INDICATOR FOR SCREW-PRESSES.

SPECIFICATION forming part of Letters Patent No. 312,800, dated February 24, 1885.

Application filed April 23, 1884. (No model.)

*To all whom it may concern:*

Be it known that I, RUFUS E. BOSCHERT, of Syracuse, in the county of Onondaga, in the State of New York, have invented new and useful Improvements in Strain-Indicators for Screw-Presses, of which the following, taken in connection with the accompanying drawings, is a full, clear, and exact description.

To mechanical engineers it is a well-known fact that in the operation of a screw-power the screw is more or less subjected to torsional strain, incident to the friction and inclination of the engaging screw-threads of the nut revolving about the screw, and inasmuch as the aforesaid strain is, under ordinary circumstances, not discernible, the screw is frequently strained to excess, so as to either impair its strength or break it.

It is to guard against these injurious effects which my invention has for its object; and to that end my invention consists, essentially, in the combination, with a screw, of a pointer rigidly attached to said screw, so as to partake of the motion thereof, and extended laterally from the screw to indicate by the vibration of the free end of the pointer the degree of torsion exerted on the screw, said pointer being prolonged so as to render the movement thereof more readily perceptible, all as hereinafter more fully described, and specifically set forth in the claims.

The invention is fully illustrated in the annexed drawings, wherein Figure I is a plan view of a press provided with my improvements. Fig. II is an end view of the top portion of said press. Fig. III is a detached plan view of my invention as constructed for use in short screws, and greatly exaggerating the movement received by the torsional strain on the screw, thus rendering the degree of said strain more easily discernible. Fig. IV is an end view of the aforesaid device. Fig. V is a side view of that portion of the aforesaid device which is directly over the screw, and Fig. VI is a side view of the free end of the pointer or indicator, showing its deflection for bringing it in proximity to the graduated scale.

The same letters of reference indicate the same or corresponding parts.

A A represent the head-block of a power-press. B B designate the screws, which are connected with the foot-block (not shown here) and extended through the head-block, on top of which the nuts N are connected to the screws, said nuts being in the form of the hub of gears D, which mesh in a pinion, *e*, fixed to beveled gears E, which receive motion from a pinion, *f*, on the driving-shaft F. The means for operating the nuts N, however, are immaterial in my present invention, and the actuating mechanism of the aforesaid nuts can be varied in many ways without interfering with the operation of my invention, the purpose of which is simply to ascertain the degree of torsional strain exerted on the screws B B by the nuts N N when turning the same during the operation of the press, and this I accomplish by means of a pointer or indicator, *d*, which I connect with the screw B in such a manner as to cause it to partake of the slightest motion of said screw, said indicator being extended laterally or at a right angle from the screw, and having its free end lying over a graduated scale, *s*, on one of the co-operating screws B, either at the same side or at the opposite side of the press, as may be desired. The degree of torsion exerted on the screw varies according to the pitch or inclination of the thread, producing more or less friction, and presenting greater or less resistance to the movement of the nut, and inasmuch as the friction is increased in case of lack of proper lubrication, the latter also increases the torsion of the screws. Hence the indicator *d* also serves as a guard against neglect of lubricating the nuts and screws. On long screws, with the nut working on the end thereof, the torsion of the screw is more apparent than on short screws. Therefore, when my invention is to be applied to long screws the construction shown in Figs. I and II of the drawings will answer the purpose. In this case I provide the heel of the indicator *d* with a collar, C, which is integral therewith and fitted onto the end of the screw B, and clamped or fastened thereon by a set screw or key. Said collar I also form with a laterally-extended arm, on which is marked a graduated scale, *s*, over which lies the free end of the indicator *d*, secured to the co-operating screws B on the opposite side of the press. It will be observed that by this arrangement the indicator is of great length, and any torsion that may be exerted on the screw B produces sufficient motion of the free end of the indicator to make it readily apparent.

It is obvious that the shorter the screw the less twist is produced thereon under the same torsional strain, and therefore the more difficult it is to determine the degree of such strain. In such cases I provide the collar C with an arm, $a$, which is extended rigidly therefrom and terminates with a rack, $r$, which engages a pinion, $b$, pivoted to the collar C, on one of the other co-operating screws B, of the press, as shown in Fig. 3 of the drawings, and on said pinion I fasten the indicator $d$, which has its free end over the scale $s$, extended laterally from the first-mentioned collar. This arrangement produces a greatly-exaggerated movement of the indicator $d$, and thus renders more readily discernible the degree of torsion exerted on the screw. On long indicators I counter-balance the free end thereof by a weight, $n$, applied to the heel of the indicator back of the pinion $b$.

Having described my invention, what I claim as new, and desire to secure by Letters Patent, is—

1. In a screw-power, the combination, with the screw and nut working thereon, of a pointer rigidly attached to and extended laterally from said screw to indicate by the vibration of the free end of said pointer the degree of torsion exerted on the screw, substantially as set forth.

2. The combination, with a set of co-operating screws, of a graduated scale extended laterally from each of said screws, and a pointer extended from each of said screws to the scale of the other screw, substantially as described and shown.

3. The combination, with a set of co-operating screws, of the collars C C, fixed to the respective screws, and each provided with the scale $s$, rigid arm $a$, terminating with rack $r$, pivoted pinion $b$, and the pointer $d$, fastened to said pinion and extended to the scale of the collar on the other screw, substantially as described and shown, for the purpose set forth.

In testimony whereof I have hereunto signed my name and affixed my seal, in the presence of two attesting witnesses, at Syracuse, in the county of Onondaga, in the State of New York.

RUFUS E. BOSCHERT. [L. S.]

Witnesses:
F. H. GIBBS,
C. H. DUELL.